3,826,827
FEED SUPPLEMENT FOR HOOFED ANIMALS

Joseph G. Forest, Waverly, and Edward J. Czarnetzky, Chazy, N.Y., assignors to International Stock Food Corporation, Waverly, N.Y.
No Drawing. Filed Apr. 22, 1971, Ser. No. 136,563
Int. Cl. A61k 27/00
U.S. Cl. 424—164
4 Claims

ABSTRACT OF THE DISCLOSURE

The present invention relates to a feed supplement for horses and cattle, consisting essentially of an assimilable source of sulfur which may be sulfur itself, sodium, magnesium or potassium sulfate, methionine, cystine or cysteine. The treatment improves the hoofs of the animal.

The present invention relates to a feed supplement which is particularly adapted to improve the hoofs of hoofed animals and notably of horses and cattle and, in particular, relates to the use of ingestible sulfur and its compounds for this purpose.

The compositions of the present invention are applicable to treatment of all hoofed animals, but for simplicity, the rationale of the invention will be described hereinafter, almost entirely in terms of its applicability to horses.

No foot—no horse is an oil saying which can be taken literally as far as the working ability of a horse is concerned. Proper care of the horse's feet is one of the most important aspects of horse care. The present invention relates to treatment of the hoof through nutritional techniques.

In the horse, the hoof grows downward from the coronary band from just under the hairline which exists at the top of the hoof. Any injury to the coronary band affects the growth of the hoof. For example, a quarter crack usually begins at the coronary band and often runs all the way to the bottom of the hoof. A quarter crack is one in that portion of the wall of the hoof lying between the heel and the toe, and usually is more spread at the lower end of the crack. Often, the cracked hoof has become dry, hard and brittle. In general, drying out of the hoof, improper shoeing, improper trimming all contribute to hoof trouble. Certainly, an important aspect of proper care for the horse is maintenance of the outside horny shell of the hoof in a healthy condition.

Heretofore, no adequate method of alleviating hoof problems and, in particular quarter crack, have been suggested to the art. Among the techniques employed heretofore is a special shoeing which relieves the pressure in the area of the quarter crack as much as possible by trimming the bearing surface of the hoof in a manner which relieves the painful pressure from the crack. A second technique is use of a bar shoe in which the bar is fitted so that it rests on the frog. In that manner, when the foot hits the ground, the primary pressure is transferred from the wall of the foot to the frog providing relief for the area in which the quarter crack is located. Still another mode of treating quarter crack is to apply paint, ointment, humid compresses, etc. to the hoof in an effort to supply moisture or to retain the moisture already in the hoof.

An alternative to treatment or in supplementation thereof is simply to reprieve the horse. Put him or her in pasture and give the horse a good ration of hay, oats and minerals for six months or more, depending on the severity of the hoof problem.

In any event, it is important to appreciate that nature has provided the horse a unique protective coating in the form of the outside horny shell of the hoof to protect the sensitive tissues, bones, nerves, blood vessels, etc. encased therein. The horny shell grows continuously to compensate for the wear and tear of traveling on the foot and with proper nutrition, the hoof may grow quickly and with adequate strength, to carry the loads imposed thereon.

The object of the present invention is to provide a nutritional supplement, specifically adapted to assure rapid and healthy growth of the keratinaceous horny shell of the hoof.

Briefly stated, the present invention comprises the inclusion within the animal's normal ration of an ingestible sulfur containing feed supplement.

Since many forms of sulfur are assimilable at least in part, cysteine or cystine may replace the methionine in whole or in part as may sulfur itself or sulfate salts, or even high sulfur content foods such as egg yolks. Accordingly, in its broadest sense, the present invention contemplates feeding 0.1–5.0 oz./day of either methionine or a methionine equivalent. The methionine equivalent is of course another form of ingestible assimilable sulfur which may be used and should be based on the sulfur content of the equivalent, computed as if it were in methionine.

In a preferred composition, a sulfur containing amino acid, notably methionine, hydroxy methionine, cysteine or cystine or a mixture of two or all three of these should be present to an extent such that 0.5 oz./day thereof is fed to the animal. A separate point of preference is inclusion of dl-alanine in the supplement in amounts so that at least 0.05 oz./day thereof is fed to the animal.

A preferred composition is as follows:

dl-alanine—1–100 grams.
dl-methionine—1–100 grams.
sodium sulfate—0.1—100 grams.
sulfur—1–100 grams.
powdered egg yolk—1 oz.–1 lb.

It has long been recognized that all animals, including of course hoofed animals like the horse and the cow, must receive a minimum amount of protein in their food. The greater part of the muscles, internal organs, cartilage, connective tissues, skin, hair, wool, feathers, nails, hoofs, horns, etc. are all proteinacious in character, being formed from the amino acids and proteins ingested by the animal. The proteins present in the feed ingested by the horse are split into their component amino acids. The amino acids are absorbed from the digestive system, then re-constituted into whatever forms of protein are required in the various body tissues. Some of the essential amino acids can be synthesized by the animal if not available in adequate quantities in the feed, provided that the precursor materials (e.g., sulfur, alanine, etc.) are present in the feed. Others cannot be and their content in the feed may serve as limiting factors for the growth or health of the animal.

The physiology of the animal makes its own selection when the feed protein contains either an excess of some amino acids or a deficiency of essential amino acids. Providing that enough of the essential or convertible amino acids are present in the ration of the horse, the hoof will grow normally if there are no interfering instances of an altered physiology, in the form of irritation, ingestion of certain chemicals, fevers, infection, etc. Physical forces and an unfavorable ambiency may, of course, cause changes in the formed hoof.

The growth of the hoof then, is the only salvation for a damaged hoof since the insensible, nerveless hoof tissue cannot repair itself. This growth of the hoof proceeds at the rate of about 150 mm. per year in an adequately fed animal, but they may be slower and of poor quality in a horse whose rations do not contain the proper sulfur moiety.

Growth of the hoof in a well nourished horse proceeds from the coronary band and if undisturbed results in a smooth entity without cracks or fissures. Such cracks, however, quickly develop in a hoof if such a hoof is composed of defective horn issuing from an animal on a deficient ration. Thus, it is evident that a normal growth rate of hoof material plus a good quality hoof material which will endure the stress of bearing the horse's weight without damage to itself is dependent on adequate specific forms of organic sulfur or precursors of such sulfur compounds in the ration.

A frequent manifestation of a ration poor in organic sulfur is a hoof with parallel vertical ridges and/or fine cracks and a dull appearance. In unshod horses, there is also breaking away of the edges. When horses are on a deficient sulfur ration and are under stress (such as is the case in frequent and hard use and in racing), the deficient ration manifests itself in the symptoms cited above and also in the appearance of the so-called quarter crack, a fissure extending vertically from (or close to) the coronary band downward to the bottom of the hoof on the sides, or quarter portion of the hoof.

To repeat, the rationale of the present invention is a belief that the condition of the horny shell of the animals' hoofs reflects (at least in part), whether the horse has been receiving sufficient assimilable sulfur in the feed ration. More particularly, the condition may depend on whether the horse has been ingesting or synthesizing an adequate quantity of the sulfur containing amino acids, i.e., methionine, cysteine. Even though most proteins contain some sulfur, the quantity of sulfur in the horse's feed ration may vary greatly. If the ration normally contains proteins with a high enough cysteine or methionine content to fulfill all bodily requirements, then the horse should have a healthy hoof. However, if the ration is deficient in the sulfur-containing amino acids, then the hoof will, above all, suffer because the horny shell is composed principally of proteinacious matter (known as Keratin) which is high in the sulfur containing amino acids.

The practice of the present invention is that the horse be fed with a dietary supplement containing ingestible assimilable sulfur so that its requirement for sulfur are at least fully met. Preferably, an excess of sulfur is provided to promote rapid growth of strong hoofs in ailing horses. It is not only important in preventing quarter cracks to have a ration containing the so-called nutritional "requirements" of the horse, but also an overage of all of the nutrients to allow for transient periods of poor absorption due to frights, small illnesses and other forms of stress.

This overage can be supplied by an additive of a concentrate of the proper sulfur containing entities and/or their precursors. This is most readily done by the addition of one to 100 grams of dl-methionine to the ration of a 1000 pound horse each day. To insure a maximum and optimum reception and utilization of the sulfur needed, a combination of high sulfur compounds should be employed.

In confirmation of the nutritional rationale, extensive testing has, in fact, demonstrated that feeding greater than normal quanities of sulfur-containing amino acids (and even inorganic forms of sulfur) improves the quality of the hoof and results in more rapid growth of strong healthy hooves.

Desirably, the feed supplement should contain an amino acid selected from the group consisting of methionine and cysteine and in addition some dl-alanine. Inorganic sulful, notably flowers of sulfur, sodium sulfate, magnesium sulfate, potassium sulfate, may be used in partial substitution of the sulfur containing amino acid. Limits exist, however, on the quantity of inorganic sulfur that can be ingested, metabolized and otherwise converted into the proper amino acids for formation of Keratin. Still another partial substitute for the amino acids is egg yolk, a material which is known to be relatively high in sulfur-containing proteins. Egg yolk constitutes a highly desirable ingredient in a combination feed supplement.

The dosage requirements of the sulfur containing feed supplement will, of course, vary with the degree of ingestibility. Thus, for example, if dl-methionine itself (alone) were fed to the horse as little as 0.1 oz. per day will result in a discernible improvement in the hoof. Normally, substantially more would be provided, i.e., 0.5 oz.–5 oz., but a dosage rate in excess of about 5 ozs./day of dl-methionine itself or some equivalent thereof is not contemplated. A limit exists on the amount of sodium sulfate which can be administered as part of the daily nutritional dosage. Any quantity in excess of about 4 ozs. of sodium sulfate is laxative in character.

The following examples further serve to illustrate the composition and practice of the present invention.

Example I 10 grams of dl-methionine were fed daily to each of four hourses for a period of 50 days. A similar control group of four horses were maintained on the same feed rations (excepting, of course, the methionine). The hoofs of all the horses were measured for length from the coronary band to the toe to the nearest millimeter and they were all shod throughout the test period. The hoofs grew an average of 11.5 millimeters in the control group. In the experimental group, the average growth over the test preiod was 14.0 millimeters.

A visual examination of the new growth in the experimental animals showed striking changes, particularly in the older horses, whereas the new hoof growth in the control animals was about the same as older hoof growth. In the horses fed the methionine, new hoof growth was translucent in appearance and was covered with loosely adhering, fine silvery flakes of Keratin. Vigorous brushing with a stiff brush exposed a clear line of demarcation between old growth and new growth. The new growth was dense and free of cracks.

Example II

A sixteen year old mare having the most severe case of dry brittle hoofs with numerous quarter cracks on all four hoofs could not be shod for two years. Efforts had been made to correct the condition, including corrective shoeing, moisture application bandages, corona hoof ointments, vaseline application.

The following mixture of organic sulfur-containing amino acids and inorganic forms of sulfur was prepared:

| | Percent |
|---|---|
| dl cysteine | 1 |
| Sodium sulfate | 55.85 |
| dl methionine | 17.24 |
| Egg Yolk | 14.81 |
| dl-alanine | 3.7 |
| Precipitated sulfur | 7.4 |

The above materials were mixed mechanically and the mixture was fed to the mare in a dosage rate of 2 ozs. per day being administered orally 1 oz. in the morning and 1 oz. at night. No other special ration was fed and the mare was retained in pasture with other horses. The normal small portion of oats was fed daily. Treatment with the above composition was continued for a period of 52 days. Prior to commencement of this test, the hoofs of this mare were examined for the existence of quarter cracks, their length and their depth. The following table provides the measurements:

MEASUREMENT OF CRACKS (MILLIMETERS)

| Hoof | Length | Depth | Distance to coronet |
|---|---|---|---|
| 2 quarter cracks: | | | |
| Right front | 95   95 | 6   6 | 0   0 |
| Left front | 25 | 6 | 70 |
| 2 quarter cracks: | | | |
| Right rear | 95   70 | 8   6 | 0   25 |
| Left rear | 70 | 4 | 25 |

The horse was observed after 30 days, and again after 52 days. The 30 day observation showed that the cracks were starting to close, finer cracks which existed previously had all filled up and the larger cracks seemed to be filling in from the coronet gradually towards the base. After 52 days, it was noticed that there was dense new growth at the coronet, approximately 3 millimeters thick on all four hoofs, the growth being 20 millimeters long on the front hoofs, and 13 millimeters long on the rear hoofs. The following table gives the actual measurement of the cracks on all four hoofs.

MEASUREMENT OF CRACKS (MILLIMETERS)

| Hoof | Length | Depth | Distance to coronet |
|---|---|---|---|
| 1 quarter crack: | | | |
| Right front | 75 | 6 | 20 |
| Left front | OK | OK | OK |
| 1 quarter crack: | | | |
| Rear rear | 55 | 1 | 40 |
| Left rear | 65 | 1 | 30 |

As has been indicated, the discussion of the present invention has been couched almost entirely in terms of practice of the invention on horses. It must, however, be appreciated that the same type of hoof problems are encountered in other hoofed animals, whether they are cleft hoofed animals or not. To repeat, the present invention is applicable to all hoofed animals. Feeding assimilable sulfur to hoofed animals generally serves to furnish the extra sulfur required by the animal to repair damage to the hoof. The following example relates to treatment of an ailing cow.

Example III

A dairy cow (Holstein) age 6 years was in her fourth lactation. The cow dried in three months, apparently due to a severe condition of her hind hooves and legs. She could hardly support herself on the back legs. The hoofs on her back feet had large fissure or crack openings which discharged pus and blood. The condition had existed for about four months. Administration of antibiotics and other like treatment had been tried with no apparent beneficial results.

The cow was fed the composition described in Example II above at the rate of two ozs. a day, one oz. in the morning and one oz. at night. After 21 days, the hind feet showed a remarkable improvement, the cracks or fissures of both hoofs appeared to be three-fourths filled with new healthy hoof tissue and the discharge of pus and blood had halted.

What is claimed is:

1. A method of repairing hoof damage in hoofed animals which comprises supplementing the nutritionally adequate feed of said hoofed animal with an assimilable form of sulfur in an effective amount of at least 0.1 ounce measured as the methionine equivalent thereof on a daily basis.

2. The method of claim 1 wherein the daily sulfur supplement is in the range of 0.1 ounce–5.0 ounces.

3. A feed supplement composition for hoofed animals as follows:
dl-methionine—1–100 grams
sodium sulfate—0.1–100 grams
sulfur—1–100 grams
powdered egg yolk—1 oz.–1 lb.

4. The feed supplement composition of claim 3 including from 1–100 grams of dl-alanine.

References Cited

Morrison, Feeds and Feeding, pp. 72–74 and 110, (1956).

Aizinbudas et al., Chem. Abst., vol. 68, p. 37240h (1968).

SAM ROSEN, Primary Examiner

U.S. Cl. X.R.
424—162, 319